(12) United States Patent
Stagi et al.

(10) Patent No.: US 7,256,350 B2
(45) Date of Patent: Aug. 14, 2007

(54) FLUID RESERVOIR FOR A CABLE SPAN

(75) Inventors: William R. Stagi, Burien, WA (US); James Steele, Seattle, WA (US)

(73) Assignee: Utilx Corporation, Kent, WA (US)

( * ) Notice: Subject to any disclaimer, the term of this patent is extended or adjusted under 35 U.S.C. 154(b) by 0 days.

(21) Appl. No.: 11/109,926

(22) Filed: Apr. 19, 2005

(65) Prior Publication Data

US 2006/0231284 A1    Oct. 19, 2006

(51) Int. Cl.
*H02G 15/08* (2006.01)

(52) U.S. Cl. .................................................... 174/92
(58) Field of Classification Search ............... 174/76, 174/92

See application file for complete search history.

(56) References Cited

U.S. PATENT DOCUMENTS

| | | | |
|---|---|---|---|
| 1,846,361 A | | 2/1932 | Saylor |
| 2,248,588 A | | 7/1941 | Shanklin et al. |
| 3,427,392 A | * | 2/1969 | Plummer ............... 174/21 R |
| 3,444,016 A | * | 5/1969 | Baskwell ................ 156/48 |
| 3,649,952 A | | 3/1972 | Harmon |
| 3,791,406 A | | 2/1974 | Philipps |
| 3,883,208 A | | 5/1975 | Sankey et al. |
| 4,077,494 A | | 3/1978 | Spaude et al. |
| 4,202,591 A | | 5/1980 | Borgstrom |
| 4,545,133 A | | 10/1985 | Fryszczyn et al. |
| 4,669,792 A | | 6/1987 | Kjeldstad |
| 4,764,232 A | * | 8/1988 | Hunter ................... 156/48 |
| 4,888,886 A | | 12/1989 | Eager, Jr. et al. |
| 4,946,393 A | | 8/1990 | Borgstrom et al. |
| 5,082,449 A | | 1/1992 | Borgstrom et al. |
| 5,215,475 A | | 6/1993 | Stevens |
| 5,907,128 A | | 5/1999 | Lanan et al. |
| 5,952,612 A | * | 9/1999 | Winfield et al. .......... 174/74 R |
| 6,332,785 B1 | | 12/2001 | Muench, Jr. et al. |
| 6,338,637 B1 | | 1/2002 | Muench, Jr. et al. |

FOREIGN PATENT DOCUMENTS

| | | |
|---|---|---|
| DE | 1059527 | 6/1959 |
| WO | WO 01/28059 A1 | 4/2001 |

OTHER PUBLICATIONS

Eager, Jr. et al., "Extending Service Life of Installed 15-35 KV Extruded Dielectric Cables," *IEEE Transaction on Power Apparatus and Systems*, PAS-103(8):1997-2005, Aug. 1984.

* cited by examiner

*Primary Examiner*—Chau N. Nguyen
(74) *Attorney, Agent, or Firm*—Christensen O'Connor Johnson Kindness PLLC (57) ABSTRACT

Embodiments of a fluid storage and introduction device 20 constructed in accordance with aspects of the present invention are provided. One embodiment of the device 20 includes an inner assembly 24 and an outer housing 26. When assembled, the device 20 is securely coupled to a cable or cable section 30 along a portion of its span. In use, the device 20 is capable of storing remediation fluid and introducing such fluid into the cable or cable section 30.

17 Claims, 12 Drawing Sheets

FLUID RESERVOIR FOR A CABLE SPAN

FIELD OF THE INVENTION

Embodiments of the present invention generally relate to cables, such as power or data transmission cables, and in more particular, to devices for introducing remediation fluid to such cables.

BACKGROUND OF THE INVENTION

Typical underground electrical cables include a number of copper or aluminum strands surrounded by a semiconducting or insulating strand shield, a layer of insulation, and an insulation shield. This design of underground cables is known for having a useful life of 25-40 years. In some instances, the life span of an underground cable is shortened when water enters the cable and forms micro-voids in the insulation layer. These micro-voids develop throughout the insulation layer in a tree like shape, collections of which are sometimes referred to as water trees.

Water trees are known to form in the insulation layer of electrical cables when medium to high voltage alternating current is applied to a polymeric dielectric (insulator) in the presence of water and ions. As water trees grow, they compromise the dielectric properties of the polymer until the insulation layer fails. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of dielectric enhancement fluid from an external fluid source into interstices located between the strands of the cables. Please see U.S. Pat. No. 5,907,128 for a more detailed description of such an approach. The fluid reacts with water inside the cable and oligomerizes to form a fluid with dielectric enhancement properties. The oligomerized fluid functions as a water tree retardant and provides other beneficial properties.

SUMMARY OF THE INVENTION

In accordance with one embodiment of the present invention, an apparatus is provided through which a cable having a conductive core and an insulation overlayer is routed. A portion of the cable has an exposed core. The apparatus includes a housing that surrounds the portion of the cable having the exposed core; an internal fluid reservoir disposed in fluid communication with the exposed core; and remediation fluid occupying the internal fluid reservoir.

In accordance with another embodiment of the present invention, an apparatus is provided that includes a span of cable having a conductive core and an insulation overlayer is routed. A portion of the cable has an exposed core. The apparatus also includes a housing that surrounds the portion of the cable having the exposed core; and an internal fluid reservoir disposed in fluid communication with the exposed core. The apparatus further includes remediation fluid occupying the internal fluid reservoir; and means for forcing the remediation fluid into the cable at the exposed core.

In accordance with another embodiment, a method of assembling a fluid storage and introduction device is provided. The method includes providing a cable or cable section having a conductive core and an insulation overlayer; removing a portion of the insulation overlayer to expose a portion of the core; and constructing a fluid tight housing that surrounds the exposed core.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

Embodiments of the present invention will now be described with reference to the drawings where like numerals correspond to like elements. Embodiments of the present invention are generally directed to devices that store remediation fluid and subsequently introduce such remediation fluid to a cable or cable section. More specifically, embodiments of present invention are generally directed to devices that store remediation fluid along a portion of the span of the cable or cable section and subsequently introduce such fluid to said cable or cable section along such span. Although exemplary embodiments of the present invention will be described hereinafter as suitable for use with electrical power cables or cable sections, it will be appreciated that aspects of the present invention have wide application, and may be suitable for use with other cables or cable sections having an insulation overlayer, such as optical or data transmission cable. Accordingly, the following descriptions and illustrations herein should be considered illustrative in nature, and thus, not limiting the scope of the present invention, as claimed.

Figure 1:
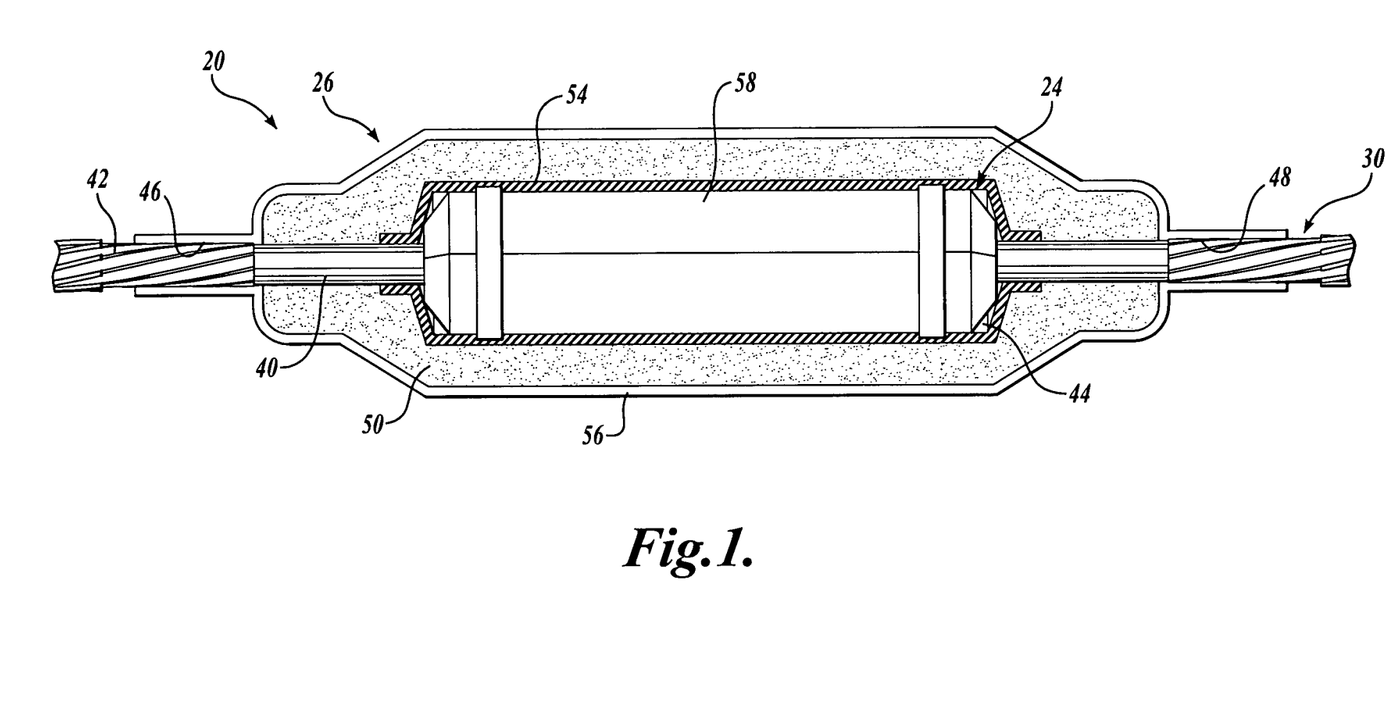
FIG. 1 is a partial cross sectional view of one exemplary embodiment of a fluid storage and introduction device constructed in accordance with aspects of the present invention.

FIG. 1 illustrates one exemplary embodiment of a fluid storage and introduction device 20 constructed in accordance with aspects of the present invention. The device 20 includes an inner assembly 24 and an outer housing 26 shown in cross-section. When assembled, the device 20 is securely coupled to a cable or cable section 30 along a portion of its span. In use, the device 20 is capable of storing remediation fluid and introducing such fluid into the cable or cable section 30.

Figure 2:
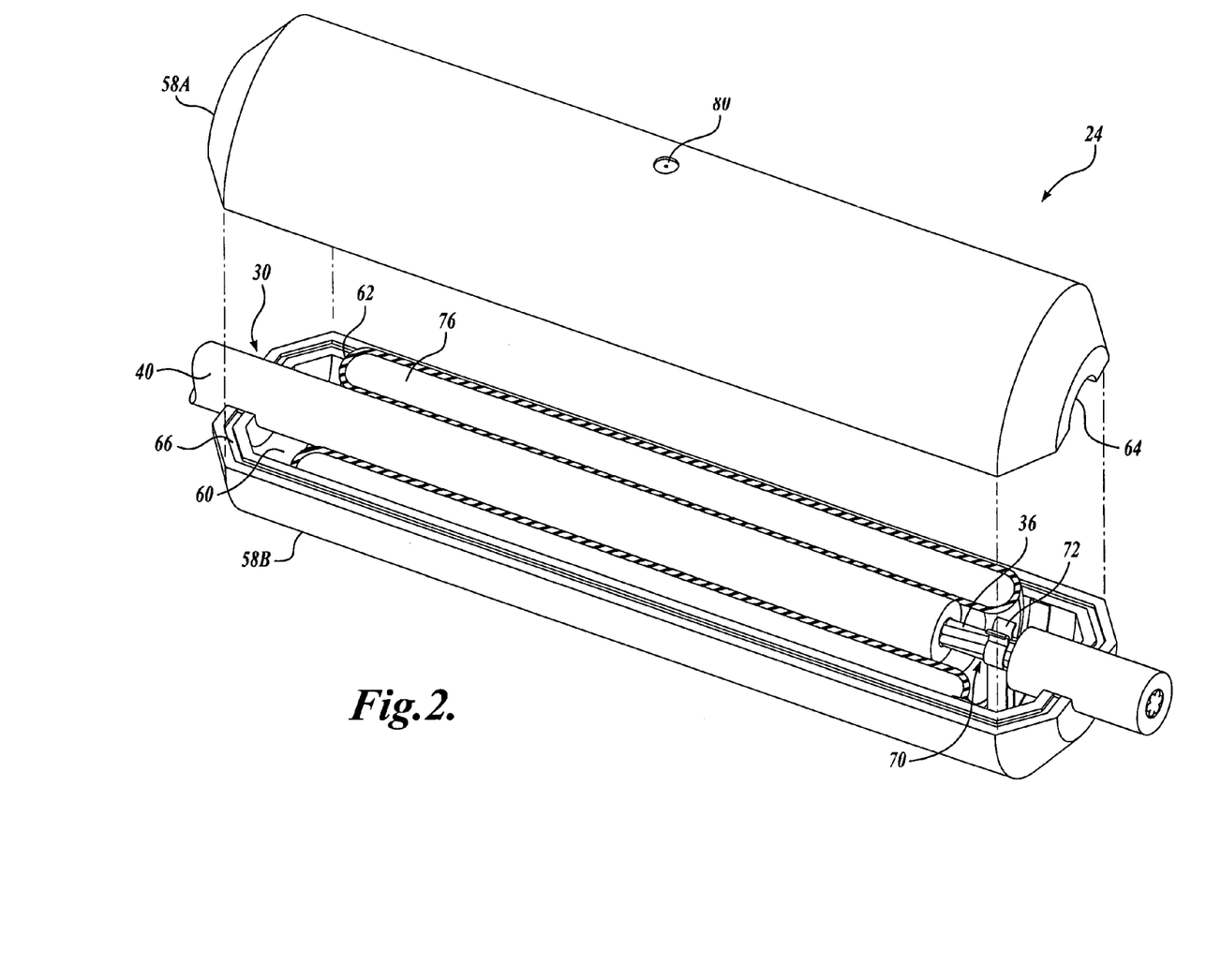
FIG. 2 is a perspective, partial assembly view of one suitable embodiment of an inner assembly of the device suitable for use with the outer housing shown in FIG. 1.

In one embodiment of the present invention, the cable or cable section 30 includes a conductive core 36 and an insulation layer 40, as best shown in FIG. 2. The cable or cable section 30 may include other components well known in the art, such as an outer protective jacket (not shown) and a plurality of longitudinally extending conductive neutral wires 42 (shown in FIG. 1). The insulation layer 40 has a generally tubular configuration that extends the length of the cable or cable section 30. The insulation layer 40 is suitably formed from a high molecular weight polyethylene (HM-WPE) polymer, a cross-linked polyethylene (XLPE), an ethylene-propylene rubber (EPR) or other solid dielectrics, wherein each may include water tree retardants, fillers, anti-oxidants, UV stabilizers, etc.

The conductive core 36 is coaxially received within the insulation layer 40 and is centrally located therein. The conductive core 36 preferably includes a plurality of electrically conductive stands, although a single strand may also be used. The strand or strands of the conductive core 36 are constructed of a suitable conductive material, such as copper, aluminum, etc. In one embodiment, the conductive core 36 may be surrounded by a semiconductive or insulating strand shield (not shown). The strand shield may be suitably formed from a compound that includes polyethylene or a similar material and surrounds the conductive core 36, such that it is disposed between the conductive core 36 and the insulation layer 40.

In one embodiment, the cable or cable section 30 is a multiple conductive strand power cable, such as medium voltage cable that carries between 5,000 and 35,000 volts. Even though a power cable is illustrated in embodiments herein, it should be apparent that other cables or cables sections, such as low voltage power cables, transmission voltage power cables, control cables, and communication cables including conductive pair, telephone, and digital communication cables, are also within the scope of the present invention. Thus, it should be apparent that within the meaning of the present invention, a cable or cable section not only includes electrical cables, but also light transmitting cables.

Referring to FIGS. 1 and 2, the components of the device 20 will now be described in detail. As described above, the device 20 includes an inner assembly 24 and an outer housing 26. The outer housing 26 defines an interior cavity 44 for encasing the inner assembly 24. At its ends, the outer housing 26 includes first and second openings 46 and 48 for providing access to the interior cavity 44. The openings 46 and 48 are sized and configured for routing the cable or cable section 30 therethrough. In one embodiment, the outer housing 26 comprises an insulating layer 50 that is sandwiched between inner and outer semi-conductive shells 54 and 56.

Referring now to FIG. 2, the inner assembly 24 comprises an inner housing 58 that defines an interior cavity 60 for encasing the internal components of the assembly, including a span of the cable or cable section 30 and a bladder 62. In one embodiment, the interior cavity 60 is oversized so as to create space between the internal components of the assembly and the inner housing 58. In use, as will be described in detail below, this space may be filled with remediation fluid, and thus, may be referred to as a fluid reservoir. Remediation fluid that may be practiced with the present invention includes but is not limited to CABLECURE®, CABLECURE®/XL, CABLECURE®/SD, CABLECURE®/CB, or Acetephenone.

The inner housing 58 is formed by left and right housing halves 58A and 58B preferably constructed of a conductive material, such as metal, or a semi-conductive material, such as plastic. Each housing half includes a semi-circular notch 64 at each end for forming aligned cable introduction openings that permit the cable or cable section 30 to be routed therethrough. The notches 64 are sized and configured to seat the cable insulation layer 40 therein. When assembled, seals or gaskets (not shown) are positioned around the perimeter of the notches 64 and between the mating surfaces of the housing halves 58A and 58B. If seals are used, each housing half may include grooves 66 for receiving such seals. To secure the housing halves 58A and 58B together to form the inner housing 58 during assembly, annular clamps, welding, heat bonding, adhesive bonding, or other suitable mechanical or chemical fastening techniques may be used.

Prior to assembly, a portion of the insulation layer 40 of the cable 30 is stripped, cut, drilled, or otherwise removed from the cable or cable section 30, thereby exposing a portion of the core 36 and forming a gap 70. The inner housing 58 is then assembled around the cable or cable section 30 to surround the exposed core 36. As such, when assembled, the gap 70 is in fluid communication with the fluid reservoir.

In one embodiment, the exposed core 36 may be electrically connected to the inner housing 58 through an electrical conductor 72. In the embodiment shown, the electrical conductor 72 clips or is otherwise coupled in electrical communication to the core 36. The electrical conductor 72 extends radially outward from the exposed core 36 and engages the inner surface of the inner housing 58 in an electrically transmitting manner. Accordingly, in this embodiment, the inner housing 58 is at the same electrical potential as the core 36. Alternatively, to electrically link the inner housing 58 and the cable core 36 for maintaining the inner housing 58 at the same voltage potential as the cable core 36, the bladder 62 may be constructed of a conductive or semi-conductive material and may be configured and arranged to suitably interconnect the cable core 36 and the inner housing 58 in electrical communication. It will be appreciated that an electrical link may be used to connect the bladder in electrical communication with the cable core 36.

The inner assembly 24 further includes at least one bladder 62 that defines an interior chamber 76. The bladder 62 is preferably constructed from a pliable yet impermeable material, such as an elastomer, e.g., rubber. When assembled, the bladder 62 is disposed within the interior cavity 60 of the inner housing 58 and extends along a portion of the cable or cable section 30. In one embodiment, the bladder 62 is disposed in surrounding relation with the cable or cable section 30 in a manner that allows fluid when present to flow between the gap 70 and the fluid reservoir defined by the interior cavity 60. In one embodiment, the bladder 62 has a U-shaped cross section, although other cross sectional shapes and configurations are contemplated to be within the scope of the present invention.

Figure 3:
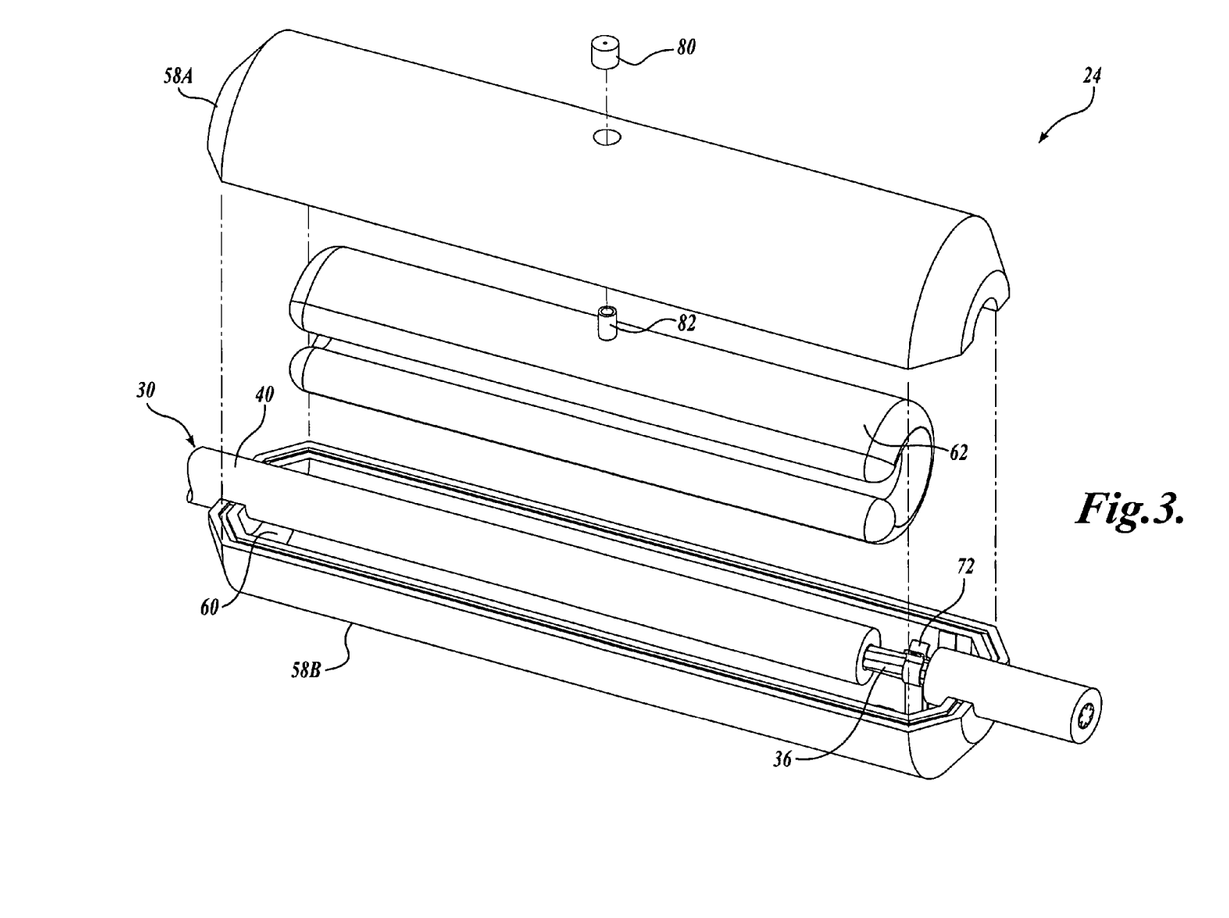
FIG. 3 is a perspective, partial assembly view of the inner assembly shown in FIG. 2.

In one embodiment, the interior chamber 76 defined by the bladder 62 may contain or be filled with gas under pressure, and thus, may be referred to as an actuation chamber. To that end, the bladder 62 may include a valved inlet (not shown but well known in the art) for selectively accessing the interior chamber 76 of the bladder 62. In embodiments of the present invention, the bladder 62 may be filled with pressurized gas prior to assembly, or may be filled after assembly of the inner connector housing 58 through an optional valve 80, such as a poppet valve, located in the inner housing 58A. A fluid passageway is provided by a bladder stem 82 for interconnecting the valve 80 and the interior chamber 76 of the bladder 62 in fluid communication, as best shown in FIG. 3. In either case, it is preferable to fill the interior chamber 76 of the bladder 62 with pressurized gas prior to the introduction of remediation fluid into the cable or cable section 30. In one embodiment, the gas contained in the interior chamber 76 is initially pressurized to approximately 5 psi, although other pressures may be practiced with the present invention, and thus, are within the scope of the present invention.

While one bladder is shown and described, it will be appreciated that in some embodiments, multiple bladders may be used. Additionally, while the preferred embodiment utilizes compressed gas as the force generator, polymeric bushings, compression springs or the like could be used to pressurize the remediation fluid contained in the fluid reservoir by applying force against the fluid reservoir. Further, the bladder may omit the interior cavity and instead be constructed as a resilient body, such as an elastic foam, rubber block, and the like.

Prior to use, a section of insulation 40 is removed from the cable or cable section 30 to expose a portion of the cable core 36. The cable or cable section 30 is then placed through the aligned notches 64 in one of the housing halves 58A or 58B. If desired, the cable core 36 may then be electrically connected to the electrical conductor 72. In embodiments where a bladder will be utilized, the bladder 62 may be placed within the interior cavity 60. The housing halves 58A and 58B are then mated and coupled in a fluid tight manner and the bladder 62 can be optionally filled with pressurized gas.

Fluid is then injected into the cable or cable section 30 from either end of the cable or cable section 30. As the remediation fluid passes through the cable or cable section 30, it exits the cable or cable section 30 into the gap 70 by passing through the interstitial spaces between the strands of the exposed core 36, thereby filling the fluid reservoir.

In embodiments where the bladder 62 is filled with pressurized gas, the fluid injected into the cable or cable section 30 is preferably injected into the cable or cable section 30 at a higher pressure than the gas contained in the bladder interior chamber 76. As the fluid is injected into the cable or cable section 30, the fluid continuously fills the fluid reservoir as it exits the cable or cable section 30 at gap 70. While fluid occupies the fluid reservoir, the fluid exerts pressure against the bladder 62, thereby compressing the bladder 62 into a smaller volume. By compressing the bladder 62 into a smaller volume, the volume or fluid capacity of the fluid reservoir increases. This decrease in the volume of the bladder interior chamber 76 increases the internal pressure of the pressurized gas contained therein. This process continues until an equilibrium between the fluid pressure in the fluid reservoir and the pressurized gas within the bladder 62 is reached.

During use, the remediation fluid stored in the fluid reservoir is introduced over a period of time into the cable or cable section 30, replacing that which is lost by diffusion into the cable insulation 40. In embodiments where the bladder interior chamber 76 is filled with pressurized gas, the pressurized gas contained within the interior chamber 76 applies pressure against the fluid contained in the fluid reservoir and imparts a driving force against the fluid to force the fluid from the fluid reservoir into the cable or cable section 30.

Figure 4:
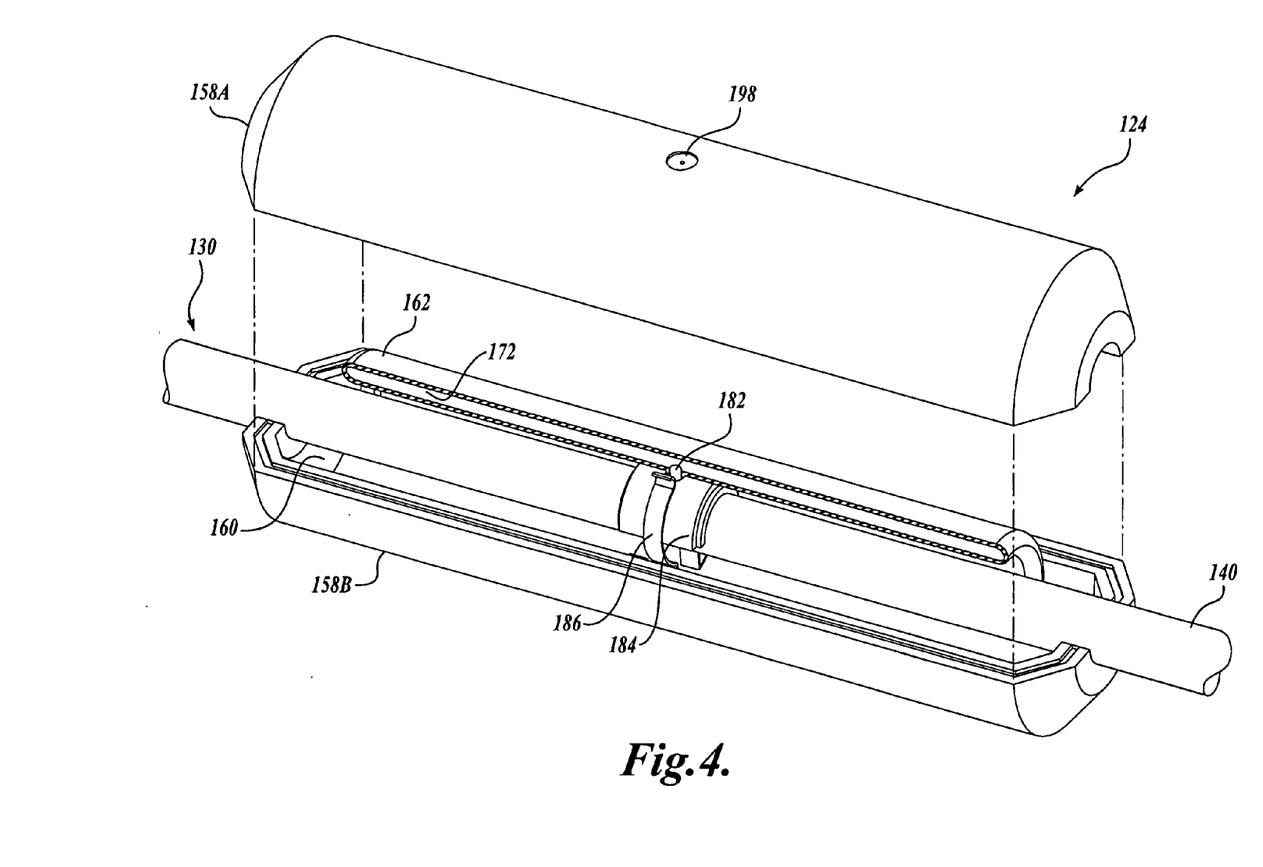
FIG. 4 is a perspective, partial assembly view of another suitable embodiment of an inner assembly of the device suitable for use with the outer housing shown in FIG. 1.
Figure 5:
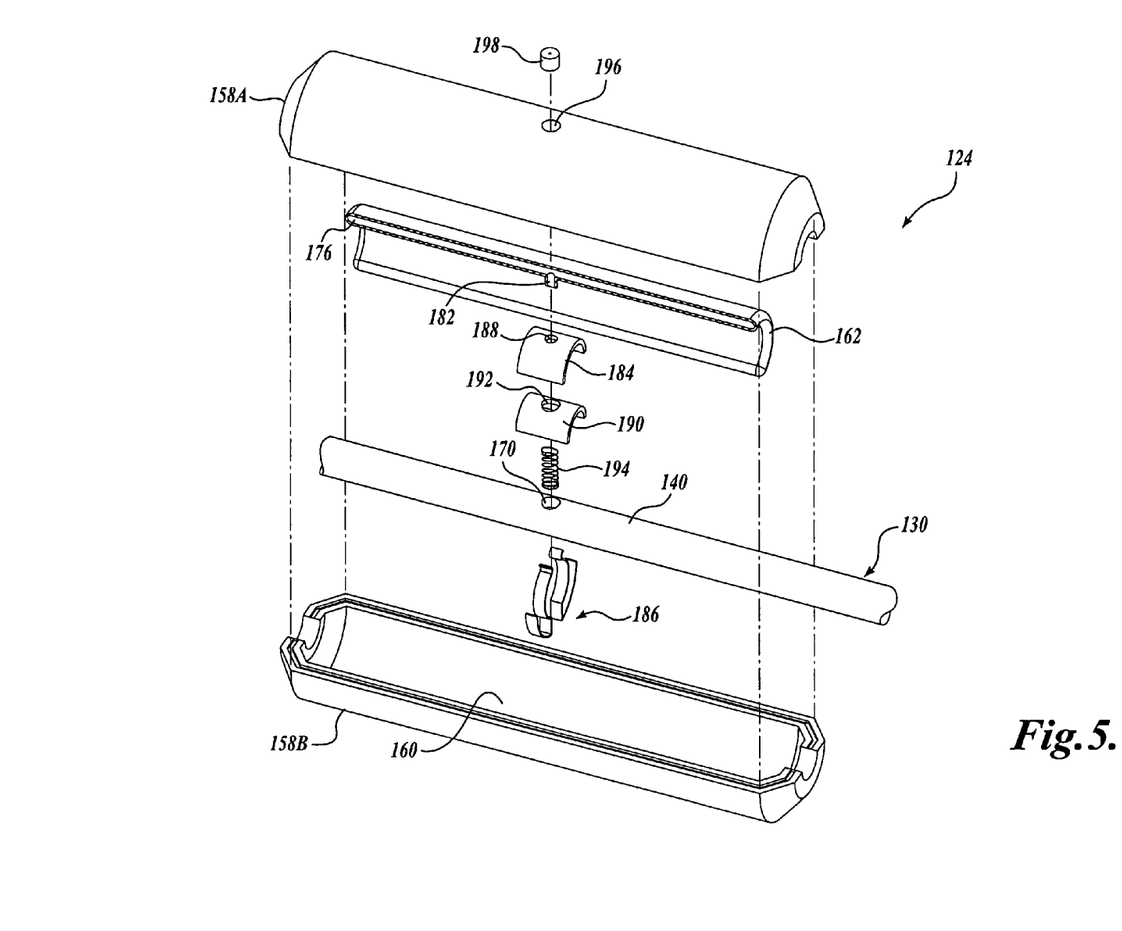
FIG. 5 is a perspective assembly view of the inner assembly shown in FIG. 4.

While the bladder may contain gas under pressure and remediation fluid is stored in the interior cavity 60 of the inner housing 58, it will be appreciated that these roles may be reversed. To that end, FIGS. 4 and 5 illustrate another exemplary embodiment of an inner assembly 124 constructed in accordance with aspects of the present invention, which is suitable for use with the outer housing 26. The inner assembly 124 is substantially similar in material, construction, and operation as the inner assembly 24 of FIGS. 1-3, except for the differences that will now be described.

In this embodiment, the gap 170 is formed by drilling a hole in the insulation 140, and is preferably more centrally located within the inner cavity 160 of the inner housing 158. An arcuate saddle member 184 overlays the insulation 140 of the cable or cable section 130 at the location of the gap 170. The saddle member 184 is selectively held in place via a pair of leaf springs 186 or other conductive or non-conductive biasing members. In the embodiment shown, the leaf springs 186 are inwardly biased arms each having an upper portion defining a radius of curvature corresponding to the outer surface of the saddle member 184. The saddle member 184 includes an opening 188 that communicates with the gap 170 when assembled. The saddle member 184 preferably rests in sealing contact with the insulation layer 140 of the cable 130 via epoxy, gaskets, seals, or other known sealing mechanisms. If used, the intermediate layer (e.g., epoxy, gaskets, seals, etc.) shown as 190 permits fluid communication between the saddle member 184 and the gap 170, such as providing an opening 192.

In one embodiment, an electrical connector or link 194 may be provided, such as a metallic spring. When this embodiment is assembled, the electrical connector 194 is disposed in the gap 170 and is electrically connected to the cable core 136 of the cable or cable section 130 and the saddle member 184. The saddle member 184 and the leaf springs 186 in this embodiment are constructed of a conductive or semi-conductive material so that the electric potential of the cable core 136 is transferred through the electrical conductor 190 and the saddle member 184 to the leaf springs 186. The leaf springs 186 are disposed within the housing in such a manner as to be electrically connected to the inner housing. As such, the inner housing 158 and the cable core 136 are at the same voltage potential.

The inner assembly 124 may further include a bladder 162 defining an interior chamber 176. The bladder 162 is preferably constructed from a pliable but impermeable material, such as an elastomer, e.g., rubber. When assembled, the interior chamber 176 defined by the bladder 162 is connected in fluid communication with the gap 170. Accordingly, fluid injected into the cable section 130 may further be introduced to and stored in the interior chamber 176 of the bladder 162. Thus, the interior chamber 176 may be referred to as a fluid reservoir. In the embodiment shown, the bladder 162 is connected in fluid communication with the gap 170 via the stem 182.

In one embodiment, the remaining space within the inner housing interior cavity 160 that surrounds the bladder 162 may be use to contain pressurized fluid for applying pressure against the bladder 162. As such, the remaining space may be referred to as an actuation chamber. An actuation chamber access port 196 may be disposed in the inner housing for introducing a pressurized fluid, such as gas, into the actuation chamber. It will be appreciated that the actuation chamber access port 196 may be fitted with a suitable valving mechanism 198, such as a poppet valve, for providing selective access to the actuation chamber. In several embodiments, pressures within the actuation chamber are contemplated to be approximately 3-10 psi. Although chamber pressures within the range of 3-10 psi are described in one embodiment, it should be apparent that the embodiments of the present invention are not intended to be so limited. As a non-limiting example, high chamber pressures are also within the scope of the present invention. Therefore, pressure ranges cited herein are intended to be non-limiting examples, and as such, a wide range of chamber pressures are within the scope of the present invention.

Figure 6:
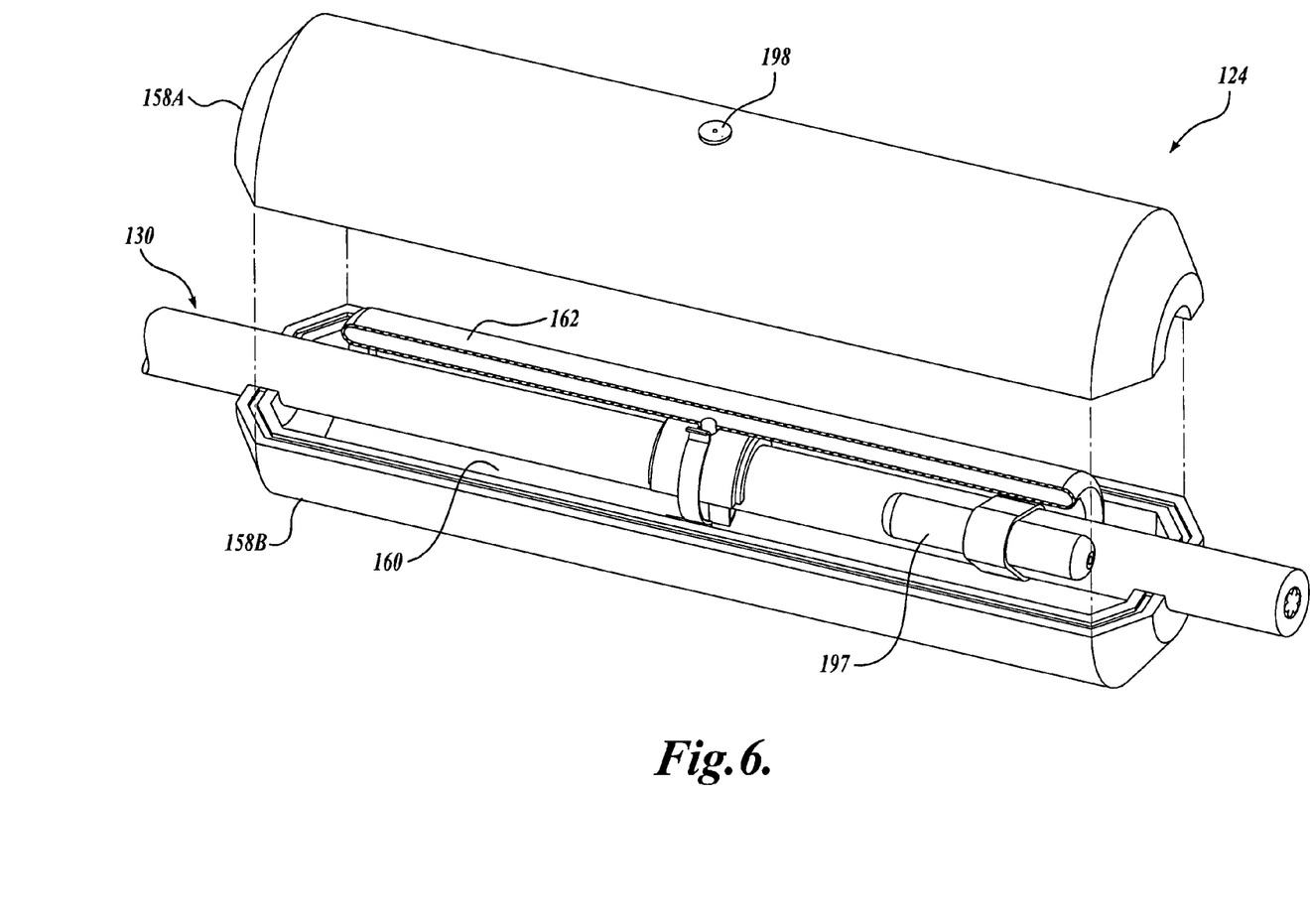
FIG. 6 is a perspective, partial assembly view of another suitable embodiment of an inner assembly of the device suitable for use with the outer housing shown in FIG. 1.

In another embodiment of the present invention, as best shown in FIG. 6, the inner assembly 124 may also include a compressed gas canister 197 disposed within the interior cavity 160 of the inner housing 158. The canister 197 includes a well known pressure regulator (not shown) for maintaining constant pressure within the interior cavity 160.

While the preferred embodiments in FIGS. 4-6 utilize compressed gas as the force generator, embodiments of the present invention should not be so limited. Therefore, it will be appreciated that other force generators, such as polymeric bushings, compression springs or the like, could be used to pressurize the remediation fluid by applying force against the fluid reservoir.

Figure 7:
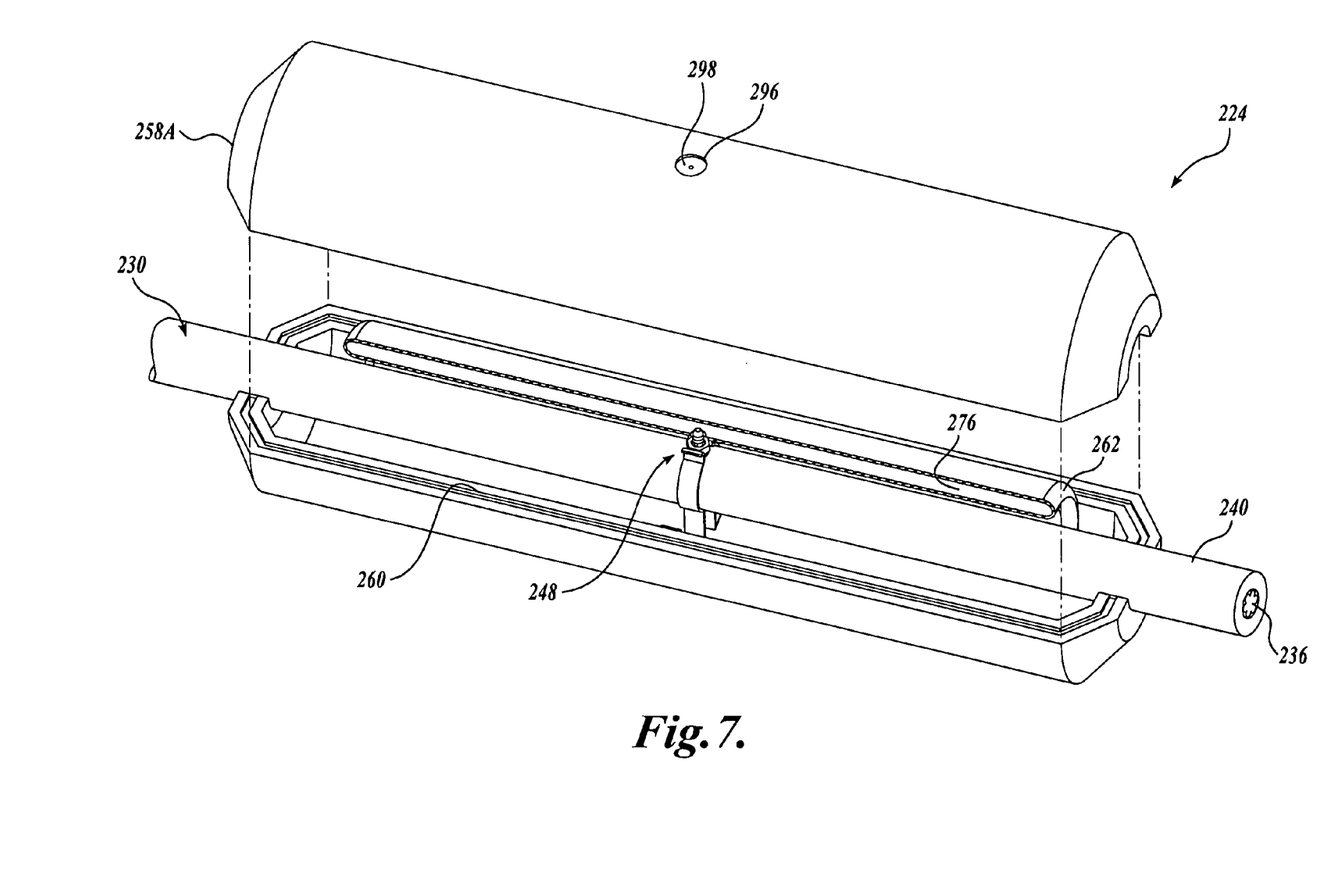
FIG. 7 is a perspective, partial assembly view of another suitable embodiment of an inner assembly of the device suitable for use with the outer housing shown in FIG. 1.
Figure 8:
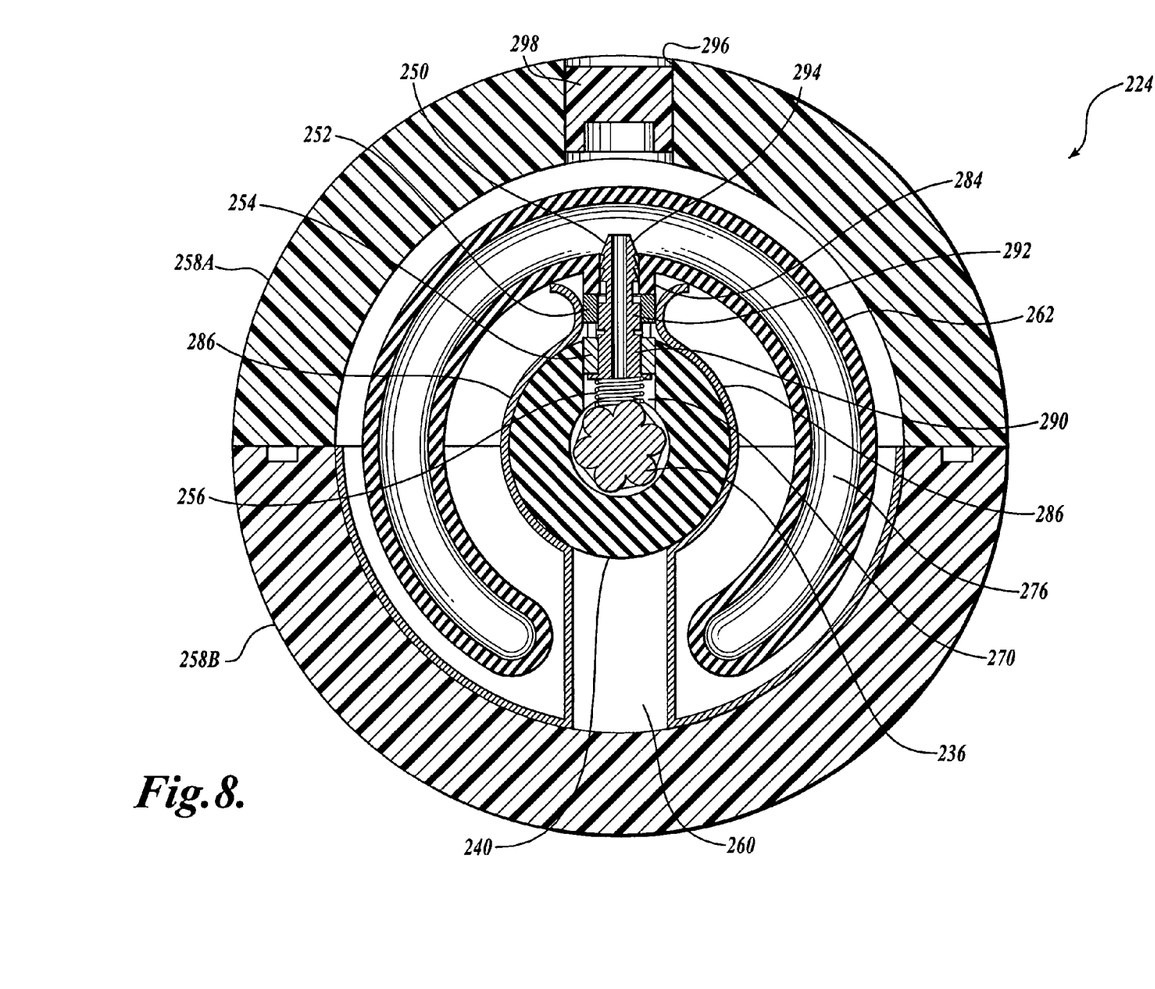
FIG. 8 is a lateral cross sectional view of the inner assembly shown in FIG. 7.

FIGS. 7 and 8 illustrate another exemplary embodiment of an inner assembly 224 constructed in accordance with aspects of the present invention, which is suitable for use with the outer housing 26 of FIG. 1. The inner assembly 224 is substantially similar in material, construction, and operation as the inner assembly 24 of FIGS. 1-3, except for the differences that will now be described. In this embodiment, instead of a saddle member (shown in FIGS. 4-6), the inner housing 258 includes a connector assembly 248 comprising a fluid connector fitting 250, a nut 252, a bushing or compression seal 254, and a support 256, as best shown in FIG. 8.

When assembled, the support 256 is placed in the gap 270 of the insulation 240 in contact with the cable core 236. The remaining components of the assembly are assembled in the following manner. The bushing 254 is placed over the base 290 of the fluid connector fitting 250 and the nut 252 is threadedly engaged with the middle section 292 of the fitting 250. This assembly 248 is then inserted into the gap 270 and rests upon the support 256. The bushing 254 is suitably dimensioned so that its outer perimeter surface sealingly slides within the gap 270. To improve the sealing engagement between the bushing 254 and the cable insulation 240, the nut 252 may be rotated in a tightening manner on the fitting 250, thereby radially expanding the bushing 254 into a forced engagement with the cable insulation 240. The upper section 294 of the fitting 250 is then connected in fluid communication with the bladder 262 through a stem 284. The support 256 is constructed to allow fluid to pass from the fitting 250 to the gap 270 and/or the cable core 236. In one embodiment, the support 256 is a coil spring. As such, the gap 270 is connected in fluid communication with the fluid reservoir 276 defined by the bladder 262.

In one embodiment of the present invention, it is preferable to have the cable core 236 and the inner housing 258 at the same voltage potential. To that end, the support 256, the fluid connector fitting 250, and the nut 252 are constructed of a conductive or semi-conductive material. As a non-limiting example, in one embodiment, the support 256 is a metallic coil spring. The assembly 248 is connected in electrical communication with the inner housing 258. In the embodiment shown, this is accomplished by a pair of leaf springs 286 or other conductive or biasing members that contact the assembly and the inner surface of the inner housing 258.

In one embodiment, the remaining space within the inner housing interior cavity 260 that surrounds the bladder 262 may be use to contain pressurized fluid for applying pressure against the bladder 262. As such, the remaining space may be referred to as an actuation chamber. An actuation chamber access port 296 may be disposed in the inner housing for introducing a pressurized fluid, such as gas, into the actuation chamber. It will be appreciated that the actuation chamber access port 296 may be fitted with a suitable valving mechanism 298, such as a poppet valve, for providing selective access to the actuation chamber. In several embodiments, pressures within the actuation chamber are contemplated to be approximately 3-10 psi. Although chamber pressures within the range of 3-10 psi are described in several embodiments, it should be apparent that the embodiments of the present invention are not intended to be so limited. As a non-limiting example, high chamber pressures are also within the scope of the present invention. Therefore, pressure ranges cited herein are intended to be non-limiting examples, and as such, a wide range of chamber pressures are within the scope of the present invention.

Figure 9:
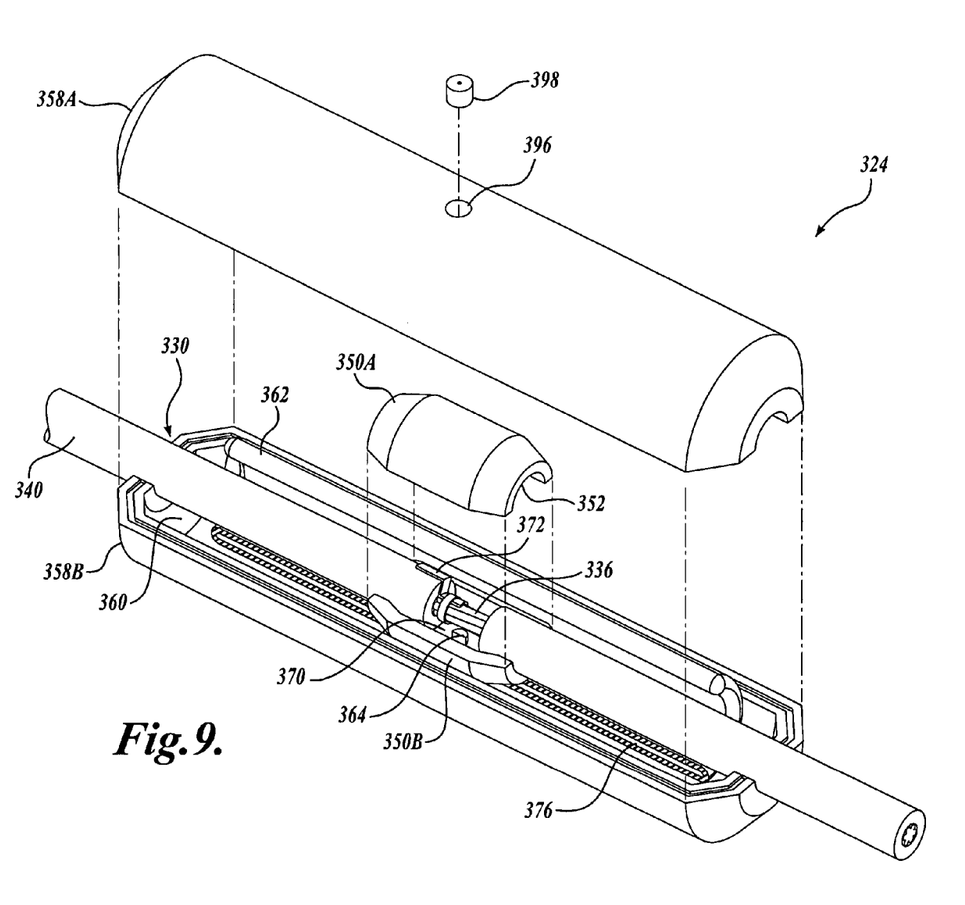
FIG. 9 is a perspective, partial assembly view of another suitable embodiment of an inner assembly of the device suitable for use with the outer housing shown in FIG. 1.

FIG. 9 illustrates another exemplary embodiment of an inner assembly 324 constructed in accordance with aspects of the present invention, which is suitable for use with the outer housing 26. The inner assembly 324 is substantially similar in material, construction, and operation as the inner assembly 24 of FIGS. 1-3, except for the differences that will now be described. In this embodiment, the inner assembly 324 further includes a core housing 350 formed by two core housing halves 350A and 350B. The core housing halves 350A and 350B are preferably constructed of a conductive material, such as metal, or semi-conductive material, such as suitable plastic. Each core housing half 350A and 350B includes a semi-circular notch 352 at each end for forming aligned cable introduction openings that permit the cable 330 to be routed therethrough. The notches 352 are sized and configured to seat the cable insulation layer 340 therein. When assembled, seals or gaskets may be positioned around the perimeter of the notches and between the mating surfaces of the halves. To secure the halves together during assembly, annular clamps, welding, heat bonding, adhesive bonding, or other suitable mechanical or chemical fastening techniques may be used.

When assembled, the core housing 350 is fluidly connected to a bladder 362 through a stem 364. The bladder stem 364 inserts into a core housing opening (not shown) preferably in a sealing manner. In the embodiment shown, the bladder 362 is at least partially disposed around the core housing 350 within the inner housing inner cavity 358. The bladder 362 is preferably constructed from a pliable but impermeable material, such as an elastomer, e.g., rubber, and defines a fluid reservoir 376. As such, the gap 370 is connected in fluid communication with the fluid reservoir 376.

In one embodiment, the remaining space within the inner housing interior cavity 358 that surrounds the bladder 362 may be use to contain pressurized fluid for applying pressure against the bladder 362. As such, the remaining space may be referred to as an actuation chamber. An actuation chamber access port 396 may be disposed in the inner housing for introducing a pressurized fluid, such as gas, into the actuation chamber. It will be appreciated that the actuation chamber access port 396 may be fitted with a suitable valving mechanism 398, such as a poppet valve, for providing selective access to the actuation chamber. In use, optional pressurized gas contained within the actuation chamber applies pressure on the bladder 362, which in turn, forces the fluid occupying the bladder 362, the core housing 350, and the gap 370 into the cable core 336.

In one embodiment, an electrical connector 372 may be provided to electrically connect the cable core 336 to the core housing 350. Thus, the cable core 336 and the core housing 350 may be at the same voltage potential in use. Further, it will be appreciated that the core housing 350 may be electrically connected to the inner housing 358 to place the inner housing 358 at the same voltage potential as the cable core 336.

Figure 10:
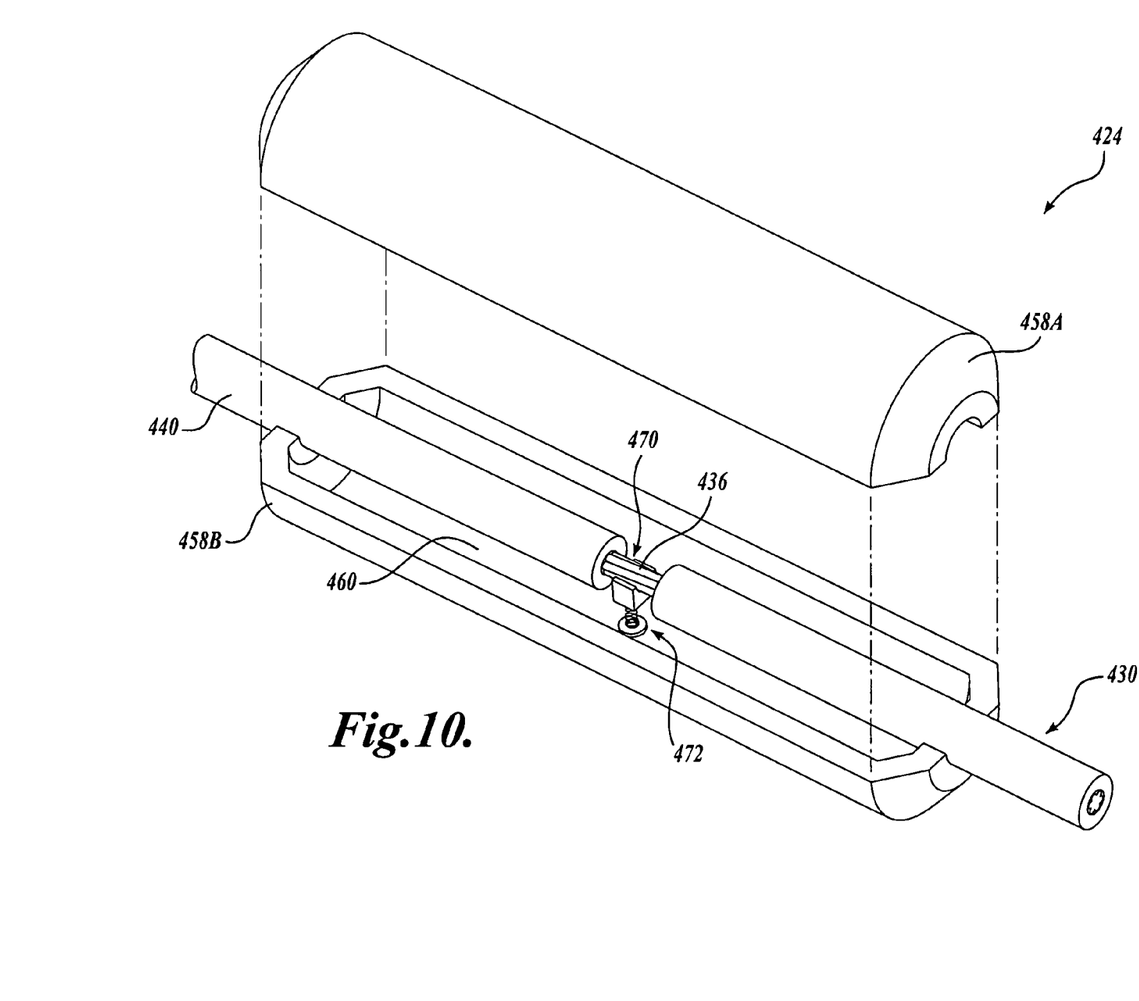
FIGS. 10-11 are perspective, partial assembly views of other suitable embodiments of an inner assembly of the device suitable for use with the outer housing shown in FIG. 1.
Figure 11:
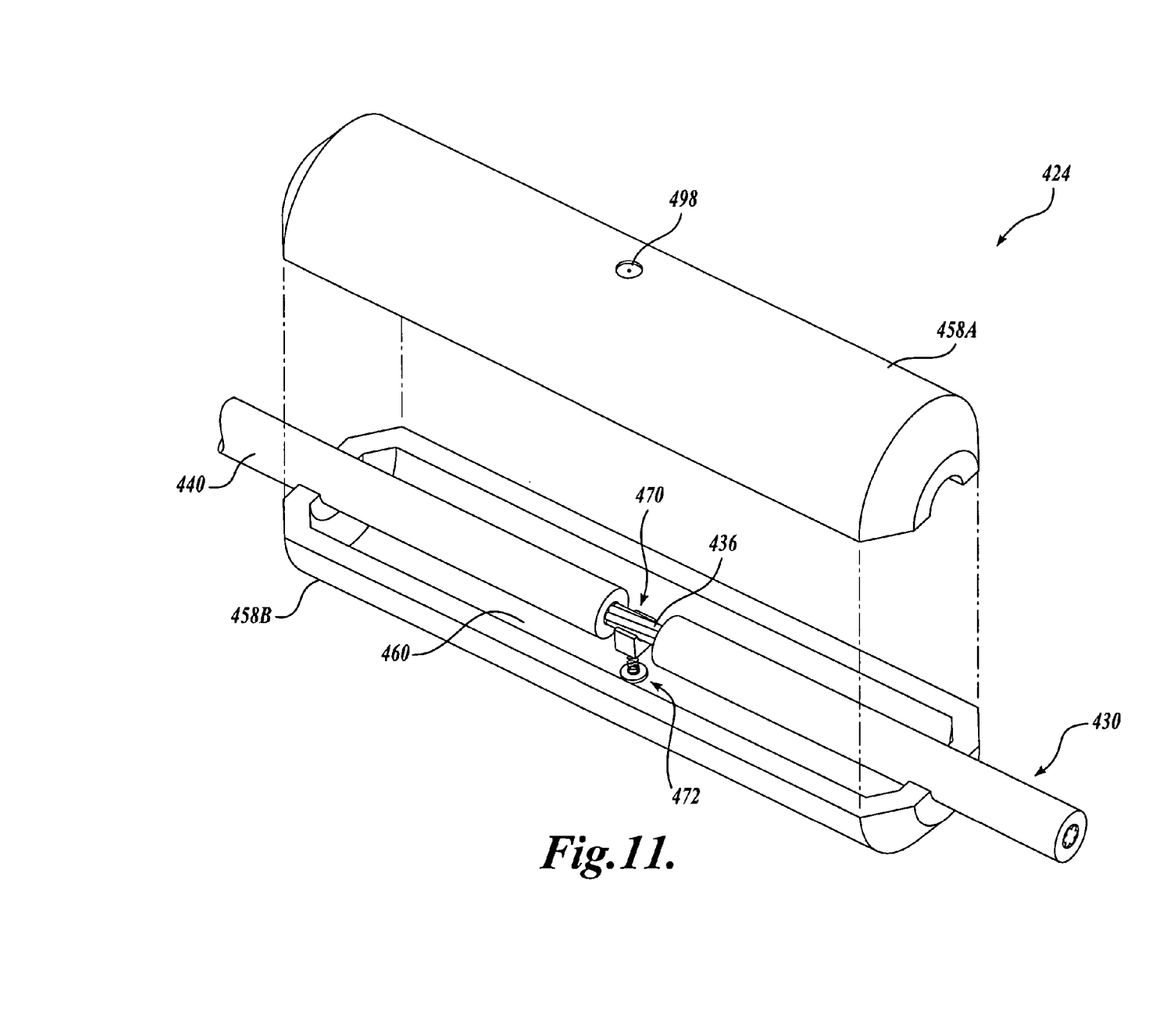

FIGS. 10 and 11 illustrate another exemplary embodiment of an inner assembly 424 constructed in accordance with aspects of the present invention, which is suitable for use with the outer housing 24 of FIG. 1. The inner assembly 424 is substantially similar in material, construction, and operation as the inner assembly 24 of FIG. 1, except for the differences that will now be described. In this embodiment, the bladder has been omitted, and the electrical conductor 472 has been formed by a spring that supports a notched member in electrical contact with the cable core 436 at the location of the gap 470. In another embodiment, the housing 458 may include a valving mechanism 498, such as a poppet valve, for selectively injecting pressurized gas into the interior cavity, as best shown in FIG. 11. It will be appreciated that other techniques may be used to electrically connect the cable core 436 to the inner housing 458, if desired.

Figure 12:
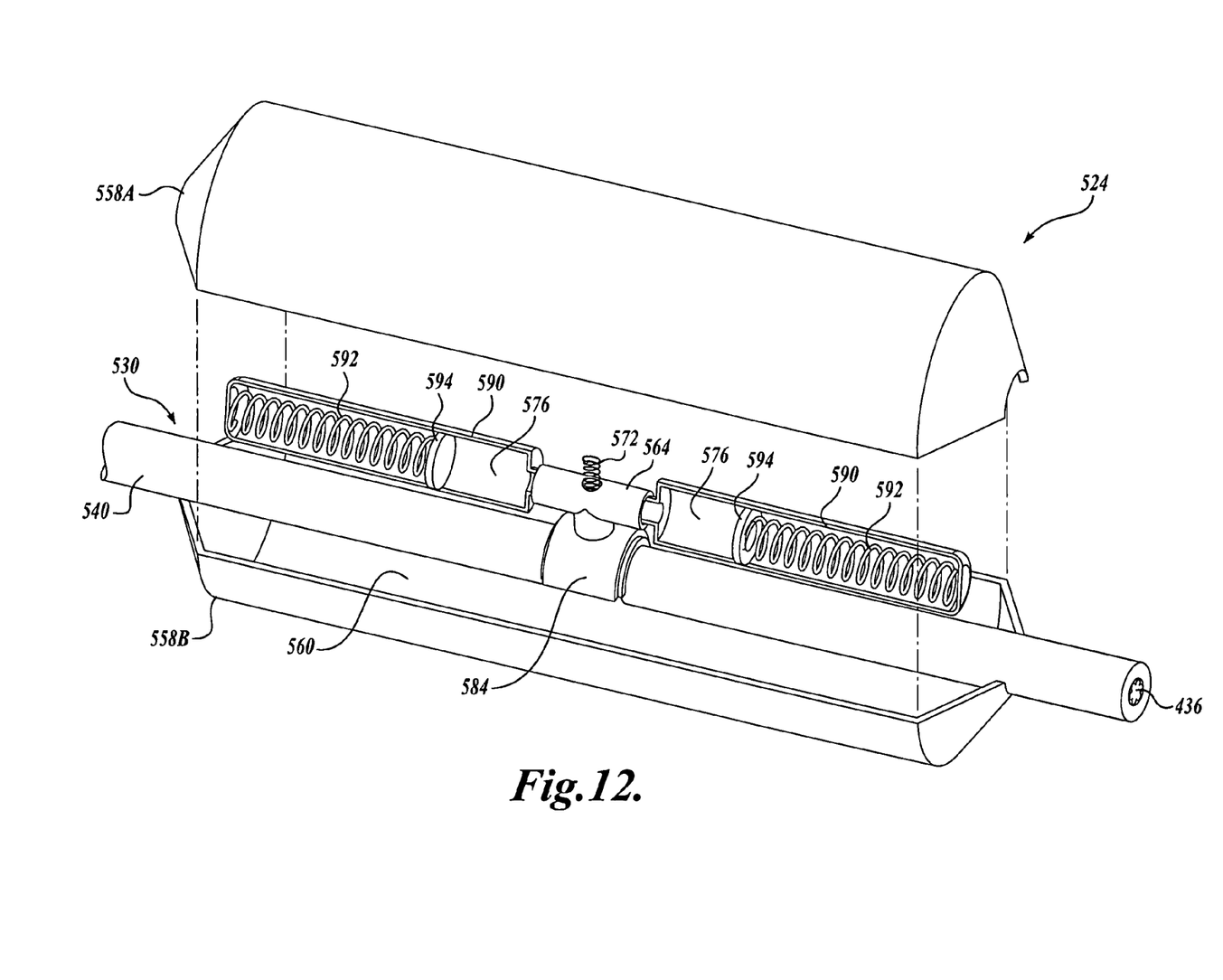
FIG. 12 is a perspective, partial assembly view of another suitable embodiment of an inner assembly of the device suitable for use with the outer housing shown in FIG. 1.

FIG. 12 illustrates another exemplary embodiment of an inner assembly 524 constructed in accordance with aspects of the present invention, which is suitable for use with the outer housing 26. The inner assembly 524 is substantially similar in material, construction, and operation as the inner assembly 124 of FIGS. 4-5, except for the differences that will now be described. In this embodiment, the bladder is omitted and in its place is at least one fluid reservoir 576 connected to the opening (not shown) of the saddle member 584 in fluid communication via a fluid connector 586. As such, the fluid reservoir is connected in fluid communication with the cable core (not shown) at the gap (hidden by the saddle member). In one embodiment, a pair of fluid reservoirs 576 may be fluidly connected to the saddle (hidden by the saddle member) via a T-shaped connector 564, as shown. While two reservoirs are shown, any number of reservoirs could be used as long as there exists sufficient space within the housing.

In either case, each fluid reservoir 576 is defined by an elongated canister 590. In one embodiment, the canister 590 may house a force generator 592 and a piston 594 for imparting a force against the fluid contained in the fluid reservoir 576. The piston 594 is configured to sealingly slide along the interior of the canister 590. The force generator 592 is shown as a biasing member, such as a coil spring; however, other biasing devices, including but not limited to polymeric bushings, elastic foam, or other force generators, such as compressed gas, may be used. The inner assembly 524 may further include an electrical connector 572, such as a metallic spring, which links the saddle member 594 and the inner housing 558 in electrical communication.

The principles, preferred embodiments, and modes of operation of the present invention have been described in the foregoing description. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention.

The invention claimed is:

1. An apparatus comprising:
   a span of cable having a conductive core and an insulation overlayer, wherein the span of cable includes an intermediate segment having an exposed core;
   a conductive housing that surrounds the intermediate segment of the cable having the exposed conductive core, wherein the housing is connected in electrical communication with the exposed conductive core and with a conductive layer of an outer assembly that surrounds the housing; and
   a pressure source disposed within the housing for applying a pressure to a remediation fluid disposed within the housing to force the remediation fluid into the power cable at the location of the exposed core.

2. The apparatus of claim 1, wherein the conductive housing sealingly engages the insulation overlayer.

3. The apparatus of claim 1, wherein the pressure source includes a bladder, and wherein the bladder applies the pressure to the remediation fluid.

4. The apparatus of claim 1, wherein the pressure source comprises means for generating the pressure to be applied to the remediation fluid.

5. The apparatus of claim 1, further comprising a fluid reservoir disposed in the housing for containing the remediation fluid, wherein the pressure source includes an actuation chamber that is fluidly isolated from the fluid reservoir.

6. The apparatus of claim 5, wherein the actuation chamber contains gas under pressure.

7. The apparatus of claim 5, wherein the actuation chamber is defined by a flexible bladder, and wherein the bladder applies the pressure to the remediation fluid.

8. The apparatus of claim 5, further comprising a piston separating the fluid reservoir and the actuation chamber, wherein the piston is movable in the direction of the fluid reservoir upon application of a force from the actuation chamber.

9. The apparatus of claim 8, wherein the force is supplied by a force generator dispose in the actuation chamber.

10. The apparatus of claim 9, wherein the force generator is a biasing member.

11. The apparatus of claim 1, wherein the pressure is generated by a biasing device or pressurized gas.

12. The apparatus of claim 1, further comprising an internal fluid reservoir disposed within the housing for storing the remediation fluid, wherein the pressure source is disposed within the internal fluid reservoir.

13. The apparatus of claim 1, wherein the conductive housing is rigid.

14. The apparatus of claim 1, wherein the outer assembly comprises a conductive inner layer in surrounding relation with the housing, an insulating layer in surrounding relation with the inner layer, and a conductive outer layer in surrounding relation with the insulation layer.

15. The apparatus of claim 1, further comprising a solid electrical connector that contacts the exposed conductive core and the conductive housing so that the exposed core is connected in electrical communication with the housing.

16. A method for remediating an underground power cable or cable section, comprising:
    providing a power cable or cable section having a conductive core and an insulation overlayer, wherein the cable or cable section includes an intermediate segment having an exposed conductive core;
    positioning a fluid tight conductive housing in surrounding relation with the intermediate segment having the exposed core, wherein the housing includes a fluid reservoir disposed in fluid communication with the exposed core;
    positioning an outer assembly in surrounding relation with the housing, wherein the outer assembly includes a conductive inner layer, a conductive outer layer, and an insulating layer disposed between the inner layer and outer layer;
    connecting the exposed core in electrical communication with the conductive housing and the inner layer of the outer assembly;
    filling the fluid reservoir with a quantity of remediation fluid;
    applying a pressure on the remediation fluid disposed within the fluid reservoir;
    supplying, over a period of time, remediation fluid from the fluid reservoir to a region of the cable or cable section located exteriorly of the housing.

17. The method of claim 16, wherein the power cable is capable of transmitting approximately 5,000 to 35,000 volts.

* * * * *

UNITED STATES PATENT AND TRADEMARK OFFICE
CERTIFICATE OF CORRECTION

PATENT NO. : 7,256,350 B2  Page 1 of 1
APPLICATION NO. : 11/109926
DATED : August 14, 2007
INVENTOR(S) : W. R. Stagi et al.

It is certified that error appears in the above-identified patent and that said Letters Patent is hereby corrected as shown below:

| COLUMN | LINE | ERROR |
|---|---|---|
| (73) Pg. 1, col. 1 | Assignee | "Utilx Corporation," should read --UTILX Corporation,-- |
| 10 (Claim 9, | 48 line 2) | "generator dispose" should read --generator disposed-- |
| 12 (Claim 16, | 8 line 23) | "reservoir;" should read --reservoir; and-- |

Signed and Sealed this

Twenty-first Day of October, 2008

JON W. DUDAS
*Director of the United States Patent and Trademark Office*